Aug. 7, 1934.    W. N. GILBERT    1,969,365

ATTACHMENT FOR SCALE PLATFORMS

Filed May 19, 1933

INVENTOR-
William N. Gilbert
BY
A. C. Maby
ATTORNEY

Patented Aug. 7, 1934

1,969,365

UNITED STATES PATENT OFFICE 1,969,365

ATTACHMENT FOR SCALE PLATFORMS

William N. Gilbert, Hudson Heights, N. J., assignor, by mesne assignments, to International Business Machines Corporation, New York, N. Y., a corporation of New York Application May 19, 1933, Serial No. 671,841

3 Claims. (Cl. 248—41)

This case relates to weighing scales and has for its object to provide readily removable meat hangers as attachments to the platforms of weighing scales.

Another object is to provide a meat hanger attachment which can be collapsed into out-of-the-way position on the platform.

Further and other objects and advantages will be hereinafter set forth in the accompanying specification and claims, and shown in the drawings, which by way of illustration show what is now considered to be the preferred embodiment of the invention.

Figure 1:
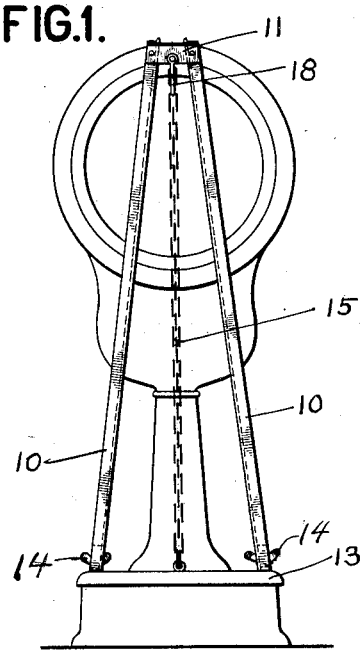
Fig. 1 is a front view of one form of the invention.
Figure 2:
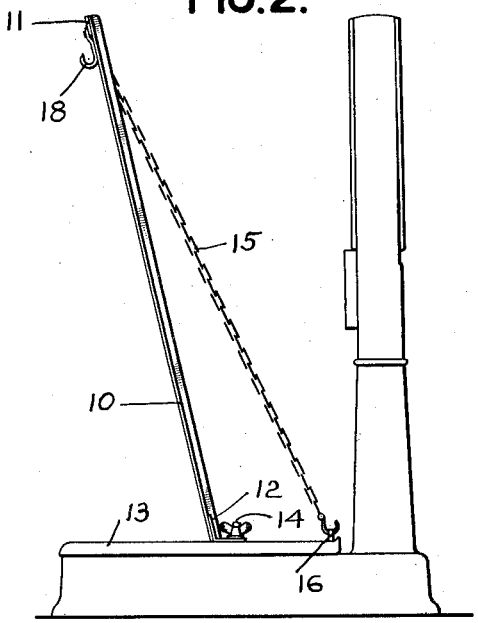
Fig. 2 is a side view of Fig. 1.

In Figs. 1 and 2, the meat hanger comprises a pair of upwardly extending angle irons 10 which slope towards each other as they extend upwardly and are joined at their upper ends by a strut 11. At their lower ends, the irons 10 have horizontal flanges or legs 12 which rest on the scale platform 13 and are removably secured thereto by wing nut and screw means 14. To one end of strut 11 is secured the upper end of a chain 15, the lower end of which is hooked to an eye 16 provided at the rear of the platform 13. The strut 11 has secured thereto the hook 18 from which the meat or other similar load is suspended to be weighed by the weighing mechanism operatively connected to the platform. This weighing mechanism may, for example, be such as shown in Patent No. 1,614,726. To remove the attachment, all that is necessary is to unscrew the wing nuts of means 14 and unhook the chain 15 from eye 16.

Figure 3:
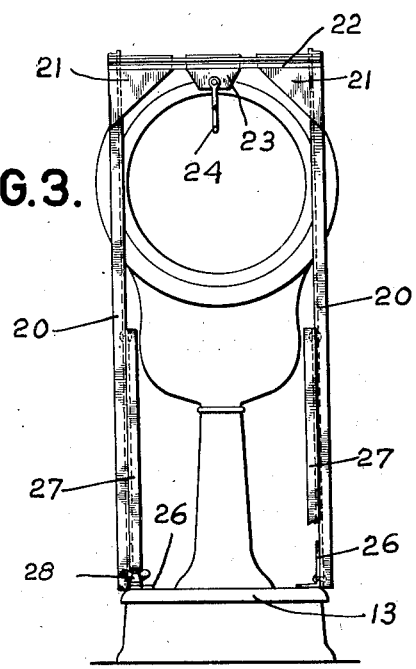
Fig. 3 is a front view of another form of the invention.
Figure 4:
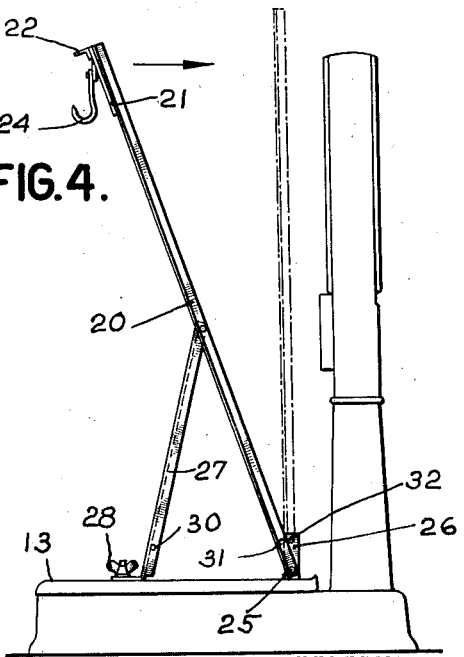
Fig. 4 is a side view of Fig. 3.

In Figs. 3 and 4, the meat hanger comprises upwardly and parallelly extending angle bars 20 to the upper ends of which are secured reinforcing triangular plates 21 joined by a horizontal angle bar 22. Between the gusset or corner plates 21 is disposed a third plate 23 secured to the bar 22. The plate 23 carries the meat hanging hook 24. The lower ends of the vertically disposed bars 20 are pivoted on pins 25 to the vertical sides of angle brackets 26 provided at the rear of the platform. Intermediate their ends, the bars 20 have pinned thereto legs 27 flanged at their lower ends and removably secured thereat to the platform by wing nut and screw means 28. In the full line position (Fig. 4), the meat hanger is adapted to receive the load. When not in use, the wing nuts of means 28 may be released from the legs 27 and the entire hanger moved about pivot pins 25 to the rear, dotted line position, legs 27 being swung inwardly on their pivotal connection to the bars 20 to nested position, at the inner sides of bars 20. To hold the meat hanger frame in collapsed, out-of-the-way position, a suitable pin is passed through the alined holes 30, 31, and 32, respectively in legs 27, bars 20, and the vertical sides of brackets 26.

While there has been shown and described and pointed out the fundamental novel features of the invention as applied to the several modifications, it will be understood that various omissions and substitutions and changes in the form and details of the devices illustrated and in their operation may be made by those skilled in the art without departing from the spirit of the invention. I, therefore, intend to be limited only as indicated by the scope of the following claims.

What is claimed is:

1. An attachment for the platform of a weighing scale, comprising a collapsible article hanging attachment having a pair of legs pivoted to each other above the platform and diverging towards the platform to form a triangular support, the base of which is the platform, an article hanger above the platform carried by the support, means for removably securing one of the legs to the platform whereby said leg may be released from the platform and folded into alinement with the other leg, and means for holding the legs in alinement and secured to the platform in idle position on the platform.

2. An attachment for the platform of a weighing scale, comprising a collapsible article hanging attachment having a pair of nestable skeleton frames pivoted to each other above the platform and movable on said pivot into open position in which the frames are relatively in front and rear positions, means for pivoting the rear frame to the platform, securing means for removably securing the front frame to the platform when the frames are in open position, an article hanger carried by one of the frames, said securing means being removable to permit the front frame to be moved rearwardly to nest in alinement with the rear frame, both frames then being movable rearwardly on the pivot of the rear frame to the platform to an idle position, and means for releasably retaining the frames in said idle position.

3. An attachment for the platform of a weighing scale, comprising a collapsible article hanging attachment having a pair of relatively rear and front, open rectangular nestable frames, the rear frame being longer than the front, the frames being pivoted to each other intermediate the length of the rear frame and spread apart at their lower ends when in active position, securing means for removably securing the lower end of front frame to the platform when the frames are spread apart, a vertical bracket carried by the platform, a pivotal connection between the lower end of the rear frame and said bracket, an article hanger carried by the upper end of the rear frame and extending above the front frame, said securing means being removable to permit the frames to be collapsed on the pivotal connection between them and between the rear frame and said bracket into nested idle position, and means for releasably holding both frames to the bracket in idle position.

WILLIAM N. GILBERT.